United States Patent
Gestler et al.

[15] 3,685,353
[45] Aug. 22, 1972

[54] SELF GENERATING REMOTE READER REGISTER

[72] Inventors: David J. Gestler, Trafford; Zoltan Kovats, Pittsburgh; Alfred W. Kolakowski, Clarksburg, all of Pa.

[73] Assignee: Rockwell Manufacturing Company, Pittsburgh, Pa.

[22] Filed: May 6, 1969

[21] Appl. No.: 822,246

[52] U.S. Cl. .................................73/194 E, 310/36
[51] Int. Cl. .........................G01f 15/06, H02k 33/02
[58] Field of Search ............73/194, 194 E, 229-231, 73/253-261, 360; 310/15, 36, 38; 235/91, 94, 103, 109, 111, 113; 324/70, 173, 174; 340/263

[56] References Cited

UNITED STATES PATENTS

| | | | |
|---|---|---|---|
| 2,491,902 | 12/1949 | Ostline | 310/36 |
| 2,857,763 | 10/1958 | Hague | 73/257 |
| 3,039,311 | 6/1962 | Bassett | 73/258 |
| 3,118,075 | 1/1964 | Dunn | 310/36 |
| 3,240,426 | 3/1966 | Newbury | 73/254 X |
| 1,458,323 | 6/1923 | Burnham | 235/103 |
| 3,555,902 | 1/1971 | Onada | 73/229 |

Primary Examiner—Richard C. Queisser
Assistant Examiner—C. E. Snee, III
Attorney—Strauch, Nolan, Neale, Nies & Kurz

[57] ABSTRACT

A meter register readable at the meter site and including gearing driving a fractional measurement indicator and an impulse generator transmitting electrical pulse currents for energizing a remote reader. The register as a whole is an assembly capable of ready assembly and disassembly from the meter as a unit and is composed of a separable primary register gear train assembly unit including a compound units counter output drive gear drive connected to a digital counter units indicator wheel and a separable auxiliary gear train assembly unit including a fractional measurement indicator and a low speed output drive gear, and a separable impulse generator assembly unit drive connected to the auxiliary gear train assembly output drive gear through an output drive gear pin and a generator cam type drive wheel reversibly spring driven at high speed to generate electrical pulses for energizing a remote reader.

13 Claims, 10 Drawing Figures

FIG 1

INVENTORS
DAVID J. GESTLER
ZOLTAN KOVATS
ALFRED W. KOLAKOWSKI
Strauch Nolan Neale Nies & Kurz
ATTORNEYS

PATENTED AUG 22 1972

INVENTORS
DAVID J. GESTLER
ZOLTAN KOVATS
ALFRED W. KOLAKOWSKI
Strauch Nolan Neale Ness + Kurz
ATTORNEYS

INVENTORS
DAVID J. GESTLER
ZOLTAN KOVATS
ALFRED W. KOLAKOWSKI

Strauch Nolan Neale Nies + Kurz
ATTORNEYS

SELF GENERATING REMOTE READER REGISTER

BACKGROUND OF THE INVENTION

The present invention comprises an improvement and simplification in self generating remote reader registers of the general type exemplified by U.S. Pats., No. 2,991,652 to R.S. Bassett issued July 11, 1961, No. 3,039, 311 to R.S. Bassett issued June 19, 1962, No. 3,118,075 to M.J. Dunn et al. issued Jan. 14, 1964, and Swiss Pat. No. 363,266 to Contigea, Societe Anonyme issued July 15, 1962. The structures of these prior proposed registers are both expensive to produce and expensive to maintain in operation, and lack the compactness and utilization of conventional inexpensive, long life, gearing drive means provided by the present invention.

While adaptable to any metering mechanism having a rotating output shaft, the present invention is particularly suited to fluid flow meters provided with magnetic drive mechanisms and low torque registering mechanisms of the type exemplified by U.S. Pat. Nos. 2,857,763 and 3,093,307 to R.Z. Hague et al. respectively, issued Oct. 28, 1958 and June 11, 1963. In such meters, the register gearing and registering counters are fully isolated from the fluid being measured to assure that the gearing and registering means are not subjected to the corrosive effect of the fluid being measured, the sole motive power is provided by the fluid flow through the measuring chamber itself, and the register mechanism can be produced as a distinct and separable unit for ready removal, servicing, and/or replacement without the need of disrupting the fluid flow line.

SUMMARY OF THE INVENTION

It is a primary object of the present invention to provide a simplified, rugged, and long lasting impulse generator drive connection between the on site register mechanism and the impulse generator.

A further important object of the present invention is to provide a meter register and impulse generator composed of an assembly of respective separable units housed in a unit housing removably mounted on the basic metering housing.

Still another object of the present invention resides in providing a meter register and impulse generator assembly wherein the register gearing for driving the registering mechanism readable at the site of installation of the meter includes a compound take-off gear for driving a fractional volume indicator disk and a separable gear train designed to continuously drive the impulse generator input gear in one direction at low speed to tension a biasing spring through a releasable generator drive coupling reversibly driven by the spring at high speed at predetermined intervals to generate an impulse current transmitted by suitable electrical leads to a remote electrically energized reader to register on the remote reader predetermined incremental metered volumes of the fluid flow passing through the meter.

Another object of the present invention is to provide a meter register and impulse generator with low torque, lightweight register and generator drive gear trains adapted to be driven through a magnetic drive coupling interposed between the metering mechanism of the meter and the input gear shaft of the register.

BRIEF DESCRIPTION OF THE DRAWINGS

Still further objects of the invention will appear from the following description and appended claims when read in conjunction with the accompanying drawings wherein:

DESCRIPTION OF THE PREFERRED EMBODIMENT

With continued reference to the drawings wherein the same reference numerals are used throughout the several views, the numeral 20 indicates generally the meter register and impulse generator of the present invention mounted on the meter housing 21 carrying the non-magnetic measuring chamber 22 of a conventional type piston meter having a piston 23 of non-magnetic material operating in conventional manner in cooperation with divider plate 24 to drive magnet carrier 25 fitted with magnet 26 (FIG. 1) in a circular path around control roller 27 journalled on the centered roller pin 28 of the non-magnetic bottom assembly 29 of measuring chamber 22 in response to fluid flow through chamber 22. Meter register and impulse generator 20 includes a tubular mounting post or member 30 formed of non-magnetic material and having an integral bottom end wall 31, and external flange 32 at its upper end, having staked to it bracket member 44 of bracket and case assembly 35. Mounting post 30 is also fixed to cup-like casing 43, by suitable means, such as welding, to form a unitary member. A threaded section 33 threadedly cooperates with a clamp ring 34 for securing post 30 and casing 43 to the electrically conducting meter housing 36 forming a shield for the magnetic drive against the interference of high frequency magnetic fields as more fully disclosed and explained in the aforementioned U.S. Pat. No. 2,857,763. The inner cylindrical wall of post 30 forms a raceway for the relatively small driven magnetic roller member 37 freely carried by the lower offset end 38 of lightweight register drive spindle 39 journalled for rotation in longitudinally spaced bearings (not shown) mounted in centered bore (not shown) of an insert 41 and carrying drive pinion 42 as more fully shown and described in the aforementioned U.S. Pat. No. 3,093,307.

Figure 1:
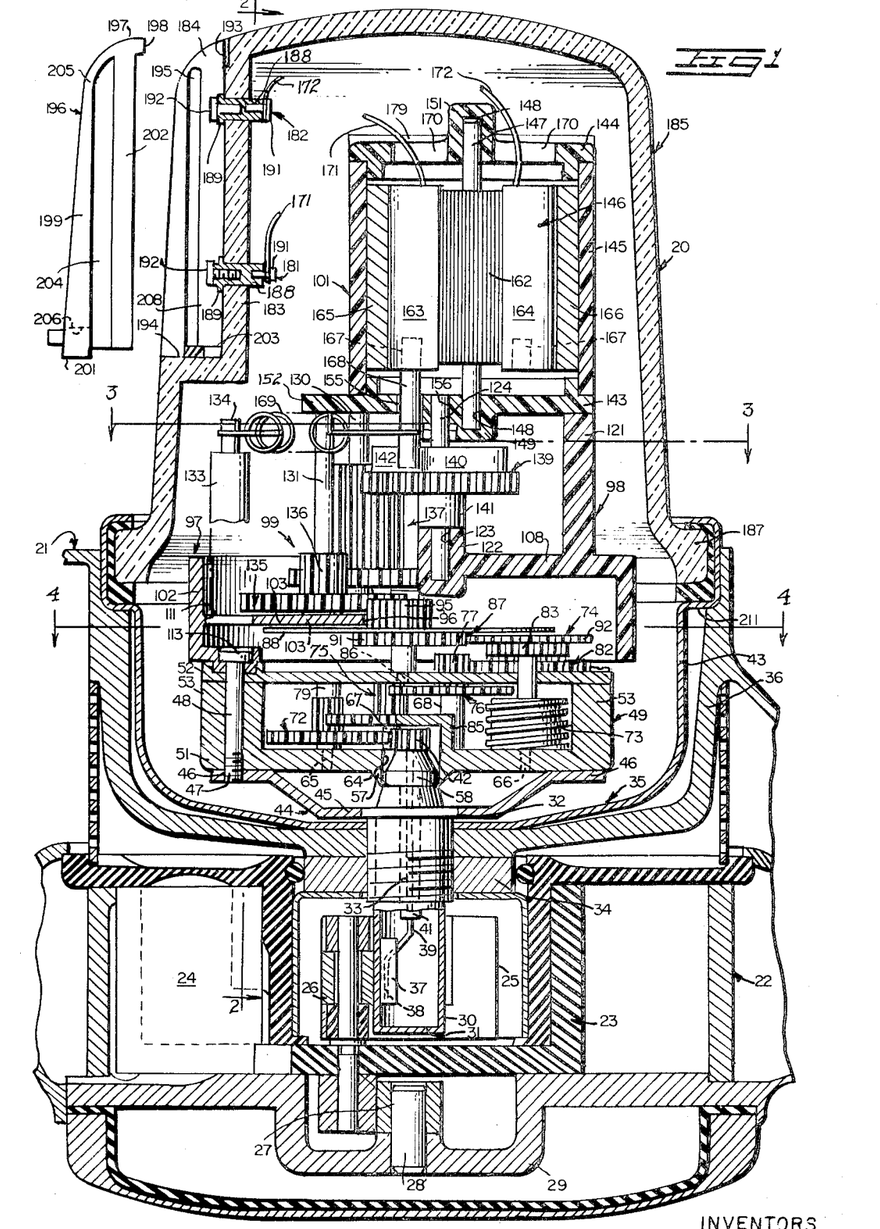
FIG. 1 is a vertical sectional view of the meter register and impulse generator of the present invention mounted on a fluid meter employing a magnetic register drive.

Bracket member 44 of bracket and case assembly 35 has a depressed center section 45 and diametrically opposed ends 46 elongated forwardly out of the sectional plane of FIG. 1 forming support pads through apertured and tapped at 47 at the sectional plane at the left and forwardly of the sectional plane at the right (see FIG. 1) to receive securing screws 48 (FIGS. 1, 3, 4 and 5) for securing register gear train support frame 49 to bracket member 44. As best seen in FIG. 1, support frame 49 is composed of lower and upper plate members 51 and 52 separated by arcuate spacer wall segments 53 (FIG. 5) integrally formed on plate 51 and overlying elongated bracket support pads 46 and apertured to freely pass the shanks of securing screws 48. Plates 51 and 52 are inwardly notched out at 54 between spacer wall segments 53 (FIGS. 4 and 5) to receive digital counter assembly 56 the counter wheels of which are journalled conventionally on shaft 55 the opposite ends of which rest in slot-like sockets 57 formed in the opposing walls 58 opening through the top of arcuate wall segments 53. The upper ends of sockets 57 are closed by the forwardly projecting laterally spaced segments 59 of top plate 52 which is fixed in place by securing screws 61 threaded into suitable tapped openings in the upper face of wall segments 53. As best seen in FIG. 4, upper plate 52 is provided with three angularly spaced upstanding hollow positioning bosses 62 for a purpose to be presently pointed out.

Figure 4:
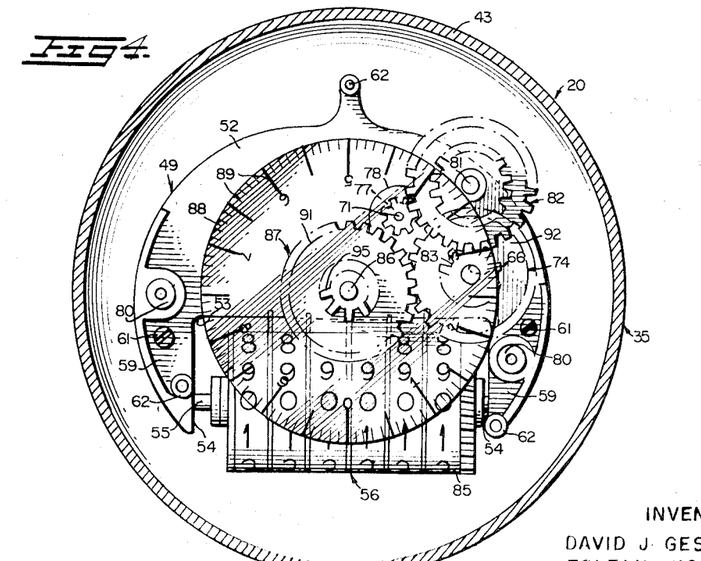
FIG. 4 is a horizontal sectional view taken substantially on line 4—4 of FIG. 1 looking in the direction of the arrows.
Figure 5:
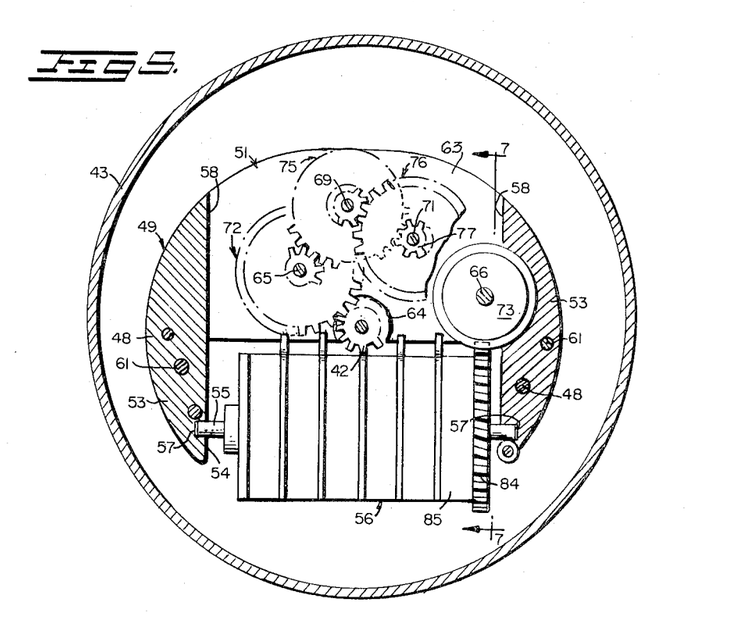
FIG. 5 is a horizontal sectional view taken substantially on line 5—5 of FIG. 2 looking in the direction of the arrows.

The bridging portion 63 of plate 51 is provided midway between wall segments 53 with an arcuate notch 64 opening into notch 54 to freely pass pinion 42 (FIG. 5) so that its upper end lies in a plane above plate 51 and respective through openings to fixedly receive the lower end of shaft 65 and journal the lower end of worm shaft 66 (FIG. 5). Bridging portion 63 is also provided with upstanding hollow bosses 67 and 68 (FIG. 2) for fixedly receiving the lower ends of journal shafts 69 and 71 (FIG. 5). Shafts 65 and 66 respectively journal compound register gear 72 (FIGS. 1, 2, and 5) and fixedly mount register output worm pinion 73 and compound transfer gear 74 located in spaced relation above plate 52 (FIGS. 1, 2, and 5, 7) while shaft 69 journals register compound gear 75 (FIGS. 1, 2, and 5) drivingly meshing with the output pinion of compound gear 72 and the larger wheel gear portion of compound register gear 76 journalled on shaft 71 with its output pinion 77 passing upwardly through opening 78 (FIG. 4) provided in upper plate 52. Plate 52 is provided with upstanding bosses 80 (FIG. 4) provided with through stepped bores for receiving securing screws 48 and positioning bosses formed on the generator support frame to be hereinafter described. Plate 52 also has a dependent blind boss 79 (FIG. 1) receiving the upper end of shaft 65 (FIGS. 1 and 2), a blind bore opening downwardly to receive the upper end of shaft 69, and a dependent boss (not shown) having a blind bore opening through the upper face offset toward its periphery and located between shafts 66 and 71 to receive an upstanding shaft 81 (FIGS. 2 and 4) journalling a compound register gear 82 (FIGS. 1, 2 and 4) above plate 52 and meshingly engaging pinion 77 and the pinion gear portion 83 of compound transfer gear 74 (FIGS. 2 and 4) to rotate gear 74, shaft 66 and worm pinion 73 as a unit. The register gear train composed of pinion 42 meshing with compound gear 72, compound gear 72 meshing with compound gear 75, compound gear 75 meshing with compound gear 76 (FIG. 5), compound gear 76 meshing with compound gear 82, and compound gear 82 meshing with pinion 83 of compound transfer gear 74 (FIG. 4) is designed through worm pinion 73 drive connected to worm wheel 84 fixed to the units counter wheel 85 (FIG. 5) to rotate units counter wheel 85 numbered 0 to 9 one complete revolution for every hundred gallons (or 10 cubic feet) of fluid passing through the metering chamber. The remaining counter wheels are conventionally arranged on shaft 55 with transfer gearing between each to effect a one-tenth revolution of each of the wheels upon one complete revolution of its neighboring wheel to the right. Lower plate 51 at the right of notch 64 is provided with an upstanding L-shaped support arm 85 (FIG. 1) the angled arm of which overhangs notch 64 and pinion 42 to limit upward movement of pinion 42 and spindle 39 during operation to maintain meshing engagement between pinion 42 and compound register gear 72.

Upper plate 52 is coaxial alignment with spindle 39 fixedly mounts an upstanding shaft 86 (FIGS. 1 and 4) journalling a compound gear 87 comprising the input drive gear of the generator gear train. Gear 87 also fixedly mounts a transparent disk 88 of high impact strength, clear polycarbonate (Lexan brand of General Electric Co.), the peripheral upper face margin of which is etched to provide a series of one hundred equally spaced radially directed line markings 89 arranged in sets of four short lines and one long line. Alternate long lines are consecutively numbered 0 to 9 and the zero marking, when the register wheels of digital counter 56 are at their zero indicating position, lies along the radius extending from the axial center of shaft 86 in a direction normal to the axis of the shaft 55 of digital counter 56 to establish the zero indicating position of disk 88 with respect to its relation to the hundreds and thousands of wheels of counter 56 or other reference point on the meter. The larger gear wheel 91 (FIGS. 1, 2 and 4) of transfer gear 87 meshes with the larger gear wheel 92 (FIGS. 1 and 4) and is geared to rotate disk 88 one complete revolution for every tenth revolution of the units counter wheel 85. As best seen in FIGS. 3 and 4, the graduated peripheral margin of disk 88 rotates in a plane above the digital counter register wheels which are readable through the disk and the transparent register cover window 93 (FIGS. 2, 3 and 8) to be described more fully hereinafter.

It will be appreciated from the preceding description that readings to one tenth of a gallon can be made using the numbered lines of disk 88 using one gear train provided with the meter. Other gear combinations can also be provided to record any desired volume, such as imperial gallons, cubic feet, etc. This disk is provided primarily to afford periodic accuracy tests of the meter and the pinion gear 95 fixed to it serves as the input drive gear for the generator drive gear train 99 (FIGS. 1, 2, and 3) to be hereinafter described in detail.

Figure 2:
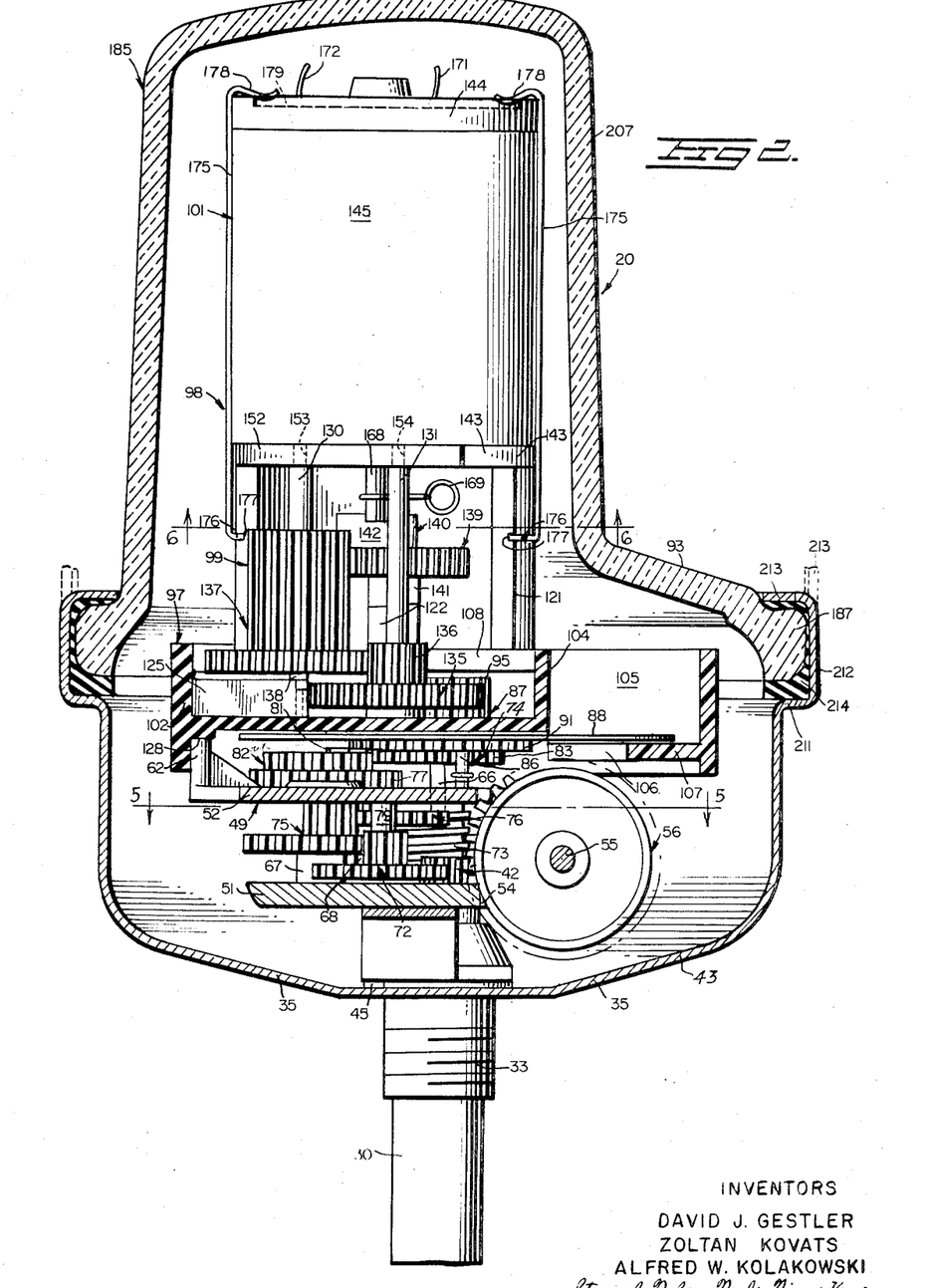
FIG. 2 is a vertical sectional view through the register unit of FIG. 1 taken substantially on the line 2—2 of FIG. 1 looking in the direction of the arrows and omitting the associated fluid meter of FIG. 1.
Figure 3:
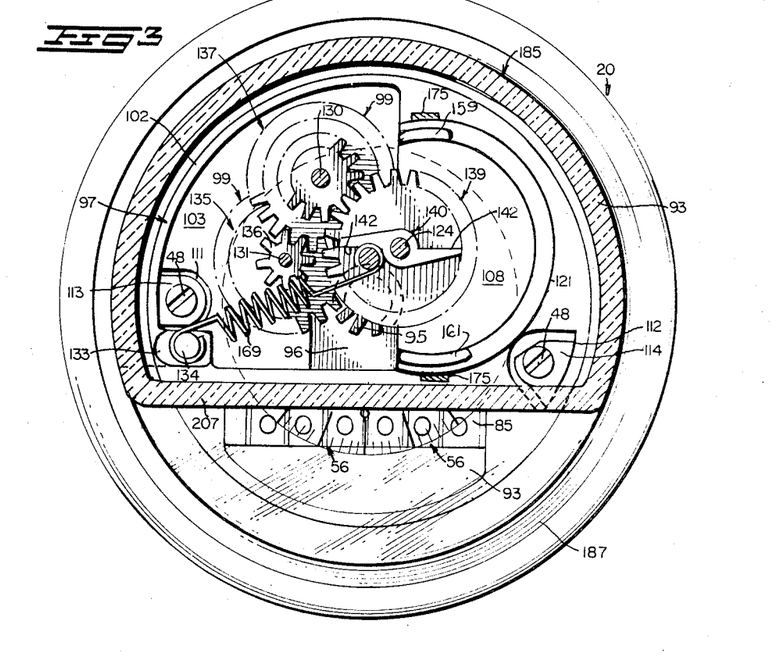
FIG. 3 is a horizontal sectional view taken substantially on line 3—3 of FIG. 1 looking in the direction of the arrows.
Figures 6, 7, 8:
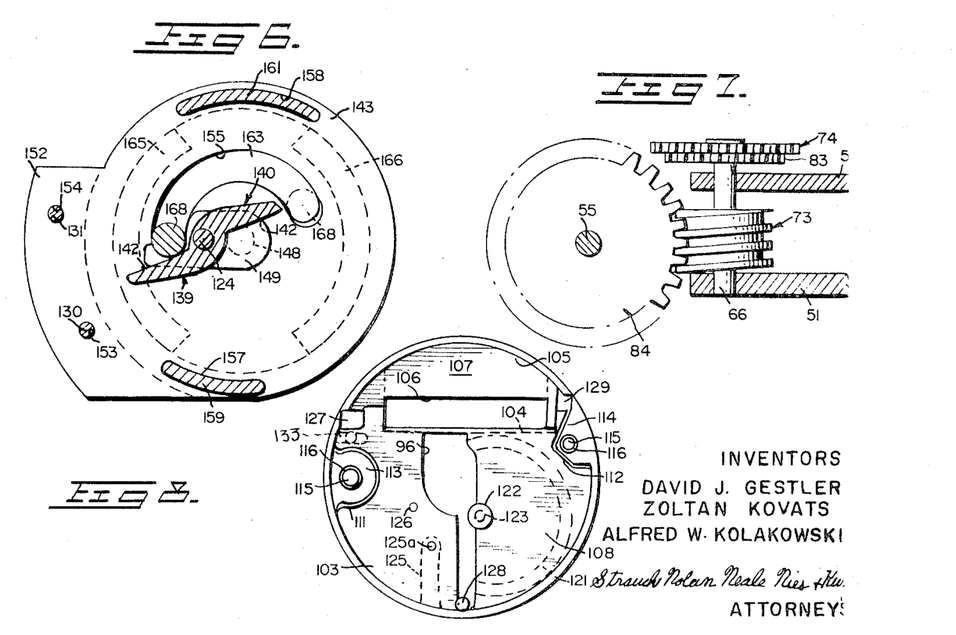
FIG. 6 is a horizontal sectional view taken substantially on line 6—6 of FIG. 2 looking in the direction of the arrows.
FIG. 7 is a fragmental vertical sectional view taken substantially along line 7—7 of FIG. 5 looking in the direction of the arrows.
FIG. 8 is a bottom plan view of the base portion of the generator support frame assembly of the present invention.

The pinion gear 95 of transfer gear 87 projects upwardly through disk 88 and through a space 96 (FIGS. 1, 3, and 8) in the base portion 97 of a generator support frame assembly 98 preferably of styrene ABS, mounting the generator gear train assembly 99 and the impulse generator assembly 101 driven thereby (FIGS. 1, 2, and 3). Referring for the moment to FIGS. 1, 2, and 8 base portion 97 comprises a base ring 102 having a first laterally directed partition wall 103 located about midway of the height of base ring 102 and extending inwardly from the left as seen in FIGS. 1 and 8 to form a free edge just short of contacting pinion 95 to define one side of space 96. As best seen from FIGS. 2 and 8, partition wall 103 adjacent the front of frame assembly 98 (the right side of FIG. 2) intersects an upstanding laterally directed wall 104 defining with the opposing portion of base ring 102 a well 105 having a rectangular sight opening or window opening 106 adjacent wall 104 and above the digital counter wheels formed by laterally inwardly directed wall segment 107 (FIGS. 2 and 8) formed at a level sufficiently below partition wall 103 (FIG. 2) to permit the peripheral edge of disk 88 to pass above wall segment 107 during rotation of disk 88. Wall segment 107 forms a background for the peripheral edge markings 89 of disk 88, which markings are preferably distinctively colored (red, for example) to increase the readability thereof.

Base ring 102 in the plane of the upper edge of wall 104 is provided with a laterally inwardly directed partition wall 108 (FIGS. 1, 2, 3, and 8) extending inwardly to form a free edge defining the other side of space 96. Partition walls 103 and 108 are respectively provided with through openings 111 (FIGS. 1, 3, and 8) and 112 (FIGS. 3 and 8) in vertically upwardly spaced relation to respective mounting ears 113 (FIGS. 1, 3, and 8) and 114 (FIGS. 3 and 8) having through stepped bores 115 and dependent coaxial bosses 116 angularly disposed to interfit in the stepped bores of bosses 80 of register gear train support frame 49 and receive securing screws 48 to fasten the register gear train assembly and the base portion 97 of generator and generator drive gear train support frame assembly 98 to bracket member 44 (see screw 48 of FIG. 1). Partition wall 108 integrally mounts an upstanding semi-cylindrical wall member 121 (FIGS. 1, 2, 3, and 8), a cylindrical vertically disposed boss 122 centered along the free edge of partition wall 108 to establish a lateral offset relation between the axes of wall member 121 and boss 122 the upstanding portion of which is provided with a blind bore 123 (FIGS. 1 and 8) for press fittingly supporting a journal shaft 124 (FIGS. 1 and 3). Partition wall 103 is provided with an upstanding elongated spacer rib 125 (FIGS. 2 and 8) the inner end of which has a vertical through bore 125a and a through bore 126 and dependent coplanar lands 127 and 128 cutting into the inner wall face of base ring 102 and forming abutment seats engageable with the upper ends of two of the cylindrical positioning bosses 62 of upper plate 52 of register gear train support frame 49. The third boss 62 of plate 52 abuttingly engages land 129 (FIG. 8) coplanar with lands 127 and 128 and formed by recessing the under face of partition wall 107 adjacent mounting ear 114. The wall portions of base ring 102 intersect lands 127, 128, and 129, preferably equi-radially spaced from the center of base ring 102 a distance sufficient to assure engagement with vertical positioning bosses 62 so that register gear train support frame 49 and base portion 97 of generator support frame assembly 98, when assembled, will interfit enabling the register gear train assembly and its support frame 49 to be removable as a unit with the generator support frame assembly 98 upon removal of securing screws 48.

Through bores 125a and 126 of partition wall 103 receive in press fitted engagement the lower ends of upstanding journal shafts 130 and 131 (FIGS. 1, 2, and 3) and wall 103 in juxtaposition to through opening 111 is provided with an upstanding generally rectangular post 133 (FIGS. 1 and 3) carrying at its upper end a cylindrical spring attachment post 134. Shaft 131 journals a compound input gear 135 the larger gear wheel of which meshes with the upper projecting pinion gear 95 of transfer gear 87 and the pinion gear 136 of which meshes with the larger gear wheel of intermediate compound gear 137 journalled on shaft 130 with its dependent hub 138 abuttingly engaging the upper face of rib 125 to maintain intermediate gear 137 in vertically spaced relation to the larger gear wheel of input gear 135. A combined output gear and generator drive cam 139 is journalled on shaft 124 with its dependent hub 141 (FIG. 1) in bearing engagement with the upper end face of boss 122 to maintain the gear teeth of output gear and generator drive cam 139 in meshing engagement with the outer ends of the gear teeth of elongated pinion gear of intermediate gear 137. The upper face of output gear and generator drive cam 139 has an upstanding camming vane 140 integrally formed thereon providing a pair of respectively diametrically disposed planar cam surfaces 142 (FIGS. 3 and 6) extending radially from a common hub portion merging tangentially into inclined trailing faces. The operation of the respective cam surfaces 142 in driving the impulse generator will be presently pointed out.

Generator and generator drive train support frame assembly 98 is completed by the three part generator assembly 101 composed of bottom end plate 143 of general cylindrical configuration and top end plate 144 of general cylindrical configuration having a press fit with the opposite ends of magnetic stator assembly 145 of cylindrical configuration and a rotor assembly 146 carried by rotor shaft 147 in respective blind bores 148 coaxially formed in dependent centered journal boss 149 and upstanding centered journal boss 151 integral with end plates 143 and 144. As best seen in FIGS. 1 and 6, bottom end plate 143 has a segmental, laterally protruding, flange 152 through bored at 153 and 154 respectively in coaxial alignment to passages 125 and 126 of partition wall 103 to freely but closely receive the upper ends of journal shafts 130 and 131 and also has an arcuate slot 155 coaxially oriented with respect to bore 148 of boss 149, a through bore 156 (FIG. 1) radially offset outwardly from bore 148 of boss 149 coaxially aligned with boss 122 of partition wall 108 to freely but closely receive the upper end of journal shaft 124 and respective angularly spaced coaxially related slots 157 and 158 (FIG. 6) freely receiving upstanding arcuate positioning posts 159 and 161 integrally formed on the upper end face of wall member 121. It follows, therefore, that shafts 124, 130, and 131 with their lower ends press fitted into partition walls 108 and 103 to render them non-rotatable heave their upper ends freely received in through bores 153, 154, and 156 of lower end plate 143 and posts 159 and 161 freely received in slots 157 and 158 adapting impulse generator assembly 101 for ready installation and removal as a unit from base portion 97 of generator support frame assembly 98.

Rotor assembly 146 comprises windings 162 (FIG. 1) wound on the stem on an I-shaped pole piece the opposite poles 163 and 164 of which extend axially with respect to shaft 147 and provide arcuate faces opposing the stator magnets 165 and 166. The lower ends of poles 163 and 164 are provided with downwardly opening blind bores 167 adapting poles 163 and 164 to selectively receive a dependent drive pin 168 (shown in FIGS. 1 and 6 fitted to pole 163) which extends downwardly as seen in FIG. 1 so that its free end is disposed to be successively engaged by the cam surfaces 142 of camming vane 140 during the unidirectional rotation of output gear and generator drive cam 139 under influence of generator gear train assembly 99.

Successive engagement of drive pin 168 by cam surfaces 142 during each full revolution of output gear and generator drive cam 139 under influence of generator gear train assembly 99 is assured by the radial offset relation of the rotational axes of output gear and generator drive cam 139 and rotor shaft 147 (see FIGS. 1 and 6) since pin 168 will move outwardly along the respective cam surfaces 142 sufficiently to clear the outmost end of the respective cam surfaces as pin 168 moves in slot 155 from the solid line position of FIG. 6 to the dot-dash line position of FIG. 6. In this connection, gear drive rotation of output gear and generator drive cam 139 is counterclockwise as seen in FIG. 3 or clockwise as seen in FIG. 6 and, due to the gear ratios between gears 87, 135, 137, and 139, is at a sufficiently slow speed to avoid generation of any electrical energy during such gear driven rotation. During such rotation, generator rotor 146 is rotated through less than one-half a full rotation and return drive spring 169, a tension spring having its opposite ends connected to spring post 134 and drive pin 168 as shown in FIG. 3, is stressed to increase its stored energy sufficiently for effecting opposite rotation of rotor assembly 146 at high speed to its home position, determined by engagement of drive pin 168 with one end of slot 155 (see FIG. 6), each time drive pin 168 rides off the end of the successively engaged cam surfaces 142. This high speed return rotation of rotor assembly 146 in the opposite direction occurs twice during each full rotation of output gear and generator drive cam 139 generating an impulse current of electricity in the coil 162 to energize leads 171 and 172 suitably connected to rotating coil 162 in well known manner and extending outwardly through slot passages 170 provided in end plate 144. This operation is assured due to the offset arrangement of the axes of shafts 124 and 147 and the radial dimensions of cam surfaces 142. By proper choice of gear ratios of the individual meshing gears 87, 135, 137, and 139 of gear train assembly 99, impulse currents can in theory be generated for any desired increment of fluid passing through the measuring chamber 22. In the embodiment of FIGS. 1 through 8, gear train assembly 99 is designed to generate an impulse current for every 100 gallons of measured fluid so that a remote reader connected to leads 171 and 172 will register increments of one hundred gallons passing through the measuring chamber and registering on digital counter assembly 56. This is the conventional setup for a remote reader provided for use will small volume meters provided for use in the average household.

Figure 9:
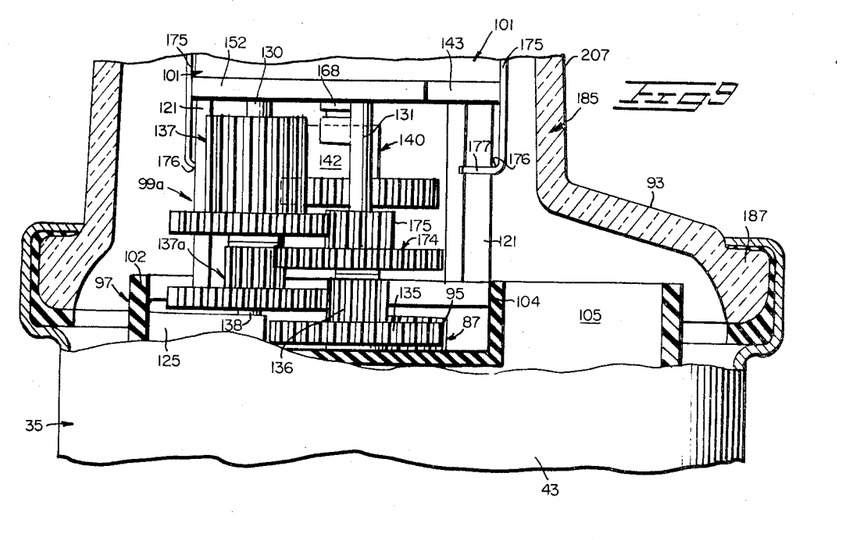
FIG. 9 is a fragmental sectional view taken substantially along line 2—2 of FIG. 1 to illustrate a modified generator gear train.
Figure 10:
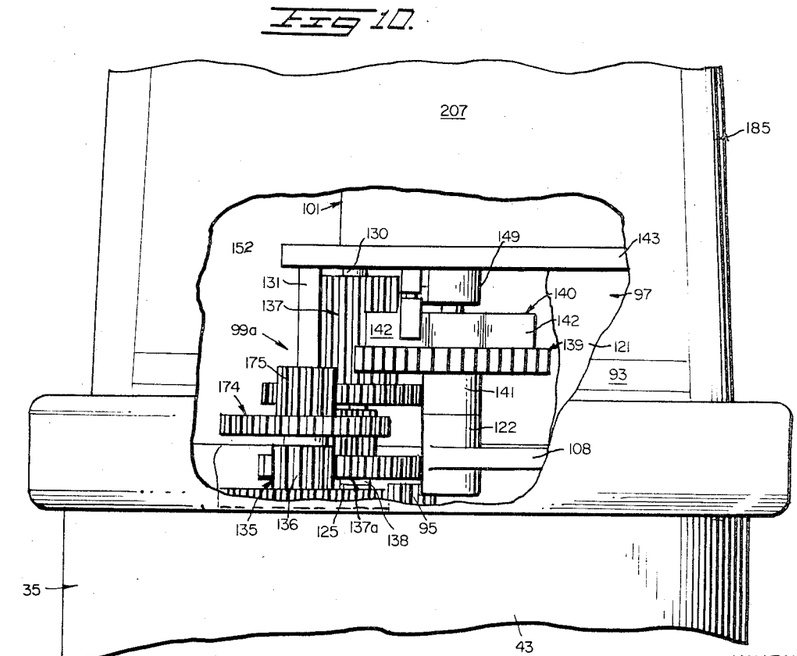
FIG. 10 is a fragmental front elevational view of the register and impulse generator of FIG. 9 with parts of the cover and generator support frame assembly broken away to expose the modified generator gear train to view.

In event a meter register and impulse generator 20 is desired for installation on larger volume meters, for example, meters provided for industrial or apartment house usage where remote reader indications in thousands of gallon increments suffices, a slight variation in the gear train assembly 99 to provide gear train assembly 99a of FIGS. 9 and 10 may be made. Referring for the moment to FIGS. 9 and 10, a further gear set composed of intermediate compound gear 137a meshing with pinion 136 of gear 135 is journalled on shaft 130 beneath gear 137 and a mating intermediate gear 174 is mounted on shaft 131 above gear 135 with its larger diameter gear wheel meshing with the pinion gear of gear 137a and its pinion gear 175 meshing with the larger diameter gear of gear 137. The ratios of these added gears is chosen to further decrease the rotational speed of output gear and generator drive cam 139 in spring tensioning direction so that the time interval during which drive pin 168 engages each cam surface 142 is increased for a given constant flow rate. As a consequence, spring 169 is stressed to the same degree irrespective of the elapsed time of driving engagement of the respective cam surfaces 142 with drive pin 168. This assures a return speed of generator rotor 146 sufficient to generate the desired impulse current irrespective of the speed of rotation of output gear and generator drive cam 139 through gear train 99 or 99a.

While the gears of drive trains 99 and 99a and generator end plates 143 and 144 may be formed from any suitable material, the present invention contemplates forming from an impact resistant plastic having self-lubricating characteristics, for example, Delrin, a polymerized formaldehyde marketed by E. I. Du Pont de Nemours and Co., Inc. The use of such material assures long life and free-running engagement of the gears, rotor shaft 147 and drive pin 168 with cam surfaces 142 without the need of periodic lubrication and servicing.

Generator assembly 101 is clamped in place on wall member 121 by means of diametrically opposed spring clips 175 (FIGS. 2, 3, and 9) the lower ends of which are inturned to provide tabs 176 interfitted into arcuate slots 177 formed in the peripheral face of wall member 121 and the upper ends of which are formed with curved tabs 178 designed to be deflected upwardly and snap into annular recess 179 (FIGS. 1 and 2) formed in the upper face of upper plate 144.

While leads 171 and 172 may take any desired form and be connected in any suitable manner to a covered transmission cable (not shown) leading to a remote electrical impulse energized reader (not shown), they are preferably of sufficient length to enable them to be factory connected by soldering them to contact terminals 181 and 182 molded into the bottom flat wall 183 of a vertically elongated well 184 of generally rectangular configuration in cross-section formed in the side wall of cover member 185 (FIG. 1), made of the same clear Lexan brand plastic used for disk 88, prior to assembly of cover 185 with the cup-like casing 43 of bracket and case assembly 35. Use of this material for cover 185 assures an impact resistant cover, that window 93 and disk 88 will be optically transparent to permit ready viewing of digital counter 56 through window 93 and disk 88, and that contact terminals 181 and 182 will be suitably electrically insulated from each other. If desired the inner side wall and top wall faces of cover 185 may be grooved to render the cover, except for window 93 and the annular ring-like flange 187, translucent. Each contact terminal 181 and 182 as will be apparent from a consideration of FIG. 1 comprises a metal sleeve 188 embedded in the wall portion 183 and formed at its outer end with a peripheral flange 189 abutting the outer planar face of wall 183. The inner open end of sleeve 188 receives in press-fitted relation a headed contact pin 191 to which leads 171 and 172 are electrically connected as by soldering while the opposite open end of sleeve 188 is suitably tapped to threadedly receive headed clamp screws 192 for securing the ends of transmission lines (not shown) leading to the remote reader.

In order to close well 184 against ingress of the elements, the outer planar face of wall 183 is inset slightly as indicated at 193 at the upper end, the inner end wall of well 194 is inset slightly at 194, the opposite side walls of well 184 are provided with respective oppositely aligned, longitudinally directed ribs 195 terminating inwardly of the upper end of well 184 to provide for an elongated sliding closure member 196. Closure member 196 at its upper end at 197 is curved to match the curvature of the upper end of cover 185 and provide a lip 198 to closely fit into the inset 193 in overlapping relation to the upper inset ledge and has a sloping outer laterally arcuate wall 199 sloped to match the slope and curvature of the cylindrical side wall of cover 185 and provide a dependent lip 201 to closely fit into the inset 194 in overlapping relation to the inset ledge of the inner end wall of well 184. Wall 199 at its opposite lateral edges is provided with laterally spaced side walls 202 extending downwardly from curved upper end 197 and terminating upwardly from the lower end of lip 201 sufficiently to abuttingly engage the upstanding planar face 203 at the inner end of well 184. Each side wall 202 is provided with a longitudinally extending groove 204 open at its lower end and of a width to closely slidingly receive the oppositely aligned ribs 195 of the well side walls. Grooves 204 are delimited along their longitudinal and upper edges by planar wall surfaces 205 which are disposed to closely slidingly engage the side walls of well 184 surrounding ribs 195. This close sliding relation together with overlapping lips 198 and 201 effectively seals well 184 against entry of the elements around closure member 196.

Closure member 196 at the lower end of wall 199 is provided with a downwardly opening rectangular notch 206 to pass the flexible covered transmission cable into well 184 and upwardly along the inner face of one side wall 202 of closure member 196 for clamped connection between the respective sleeves 188 and the heads of clamp screws 192. Notch 206 is preferably dimensioned to closely encompass the covered cable and press the flexible covering of the cable against the inner end of well 184 when closure member 196 is slid home to seal notch 206 against ingress of the elements. To further assure against ingress of the elements through notch 206 the bottom wall 183 of well 184 in spaced relation to well side wall adjacent the chordal planar wall 207 (FIGS. 2 and 3) of cover member 185 is provided with an axially directed partition wall 208 the upper end of which terminates adjacent the lower contact 191. Partition wall 208 cooperates with the adjacently related side wall of well 184 and the inner face of closure member 196 to define a narrow vertically extending passage into which the covered cable closely fits to further seal notch 206 against ingress of the elements.

The lower end of cover member 185 forming annular ring-like flange 187 adapts cover member 185 for sealed connection in the upper end of cup-like casing 43 after leads 171 and 172 have been connected to contacts 191 and 192, the leads being sufficiently long to permit cover member 185 to be telescoped over the generator assembly 101 and support frame assembly 98 after connection of the leads. As best seen in FIG. 2, cup-like casing 43 at its upper open end has a radially outwardly directed annular flange portion 211 merging into an axially directed wall sectional 212 the upper free end 213 of which curves inwardly over cover flange 187 to fix the cover to casing 43. In making this connection, a sealing ring 214 of generally L-shaped configuration in cross-section is placed within the upper end of casing 43 to line flange portion 211 and wall section 212 before the cover is positioned and the upper free end 213 is turned in over cover flange 187, this initial relationship of wall section 212 and seal ring 214 being shown in dot-dash lines in FIG. 2. With the bottom face of flange 187 resting on the radial thickened lip of seal ring 214 and fitted within the axially directed ring portion of seal ring 214, the assembled meter register and impulse generator parts and cover member 185 are subjected to a closing operation at the factory to fold the free end 213 and the liner ring inwardly around cover flange 187 to tightly clamp cover flange between flange portion 211 and free end 213 of wall portion 212 with seal ring 214 enclosing the opposing surfaces of flange 187 and casing 43. This effectively seals the cover 185 within the upper end of casing 43 to prevent ingress of the elements into the resulting meter register and impulse generator unit 20.

From the foregoing description, it will be apparent that the present invention provides a meter register and impulse generator 20 composed of unit assemblies, which may be individually manufactured and tested for proper operation and production accuracies, interfitting into a unit structure for conjoint presealing operational testing, electrical connecting of the generator leads to the embedded cover contacts and final attachment into the bracket and case assembly and sealing interconnection of the bracket and case assembly with the cover to form a final unit assembly at a final assembly station for shipment to the field for use as a replacement unit or attachment to a meter mechanism through use of a single clamp nut 34. It follows, therefore, that the novel structure of this invention assures adequate step-by-step production, inspection, and testing geared to modern quantity production procedures and easy field servicing should the register and impulse generator 20 fail in use because of age or accidental damaging in the field.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a fluid meter register having a register drive gear train including an output gear assembly: a remote reader electrical generator assembly comprising an impulse generator assembly having a magnetic field assembly and including a rotor having a drive pin radially offset from the rotor axis with an end protruding from one end of the impulse generator assembly in axial parallelism to the rotor axis; a generator drive gear train having an input gear meshing with said output gear assembly and an output gear rotating on an axis parallel to said rotor axis and disposed in a plane delimited by the rotor axis and the drive pin axis, said output gear including radially directed, upstanding drive elements moving in a path to intercept the protruding end of said drive pin during a predetermined increment of rotational movement of said output gear in one direction to engage said pin end and rotate said rotor at low speed in one direction; and spring means operatively connected to said drive pin and adapted upon said rotor rotation in said one direction to store energy in said spring means and effective upon termination of said increment of rotational movement of said output gear to release its stored energy to said drive pin and impart high speed rotation of said rotor in the opposite direction thereby generating an output impulse charge of electricity for use in actuating a remote electrical reader.

2. The remote reader electrical generator assembly of claim 1 wherein said drive elements comprise a pair of diametrically arranged vane members movable in respective sequence through said path intercepting said protruding end of said drive pin whereby two output impulse charges of electricity are generated during each complete revolution of said output gear.

3. The remote reader electrical generator assembly of claim 1 wherein said one end of said generator assembly is provided with a coaxially arranged arcuate slot through which said drive pin protrudes and one end of said slot is angularly located to predetermine a normal stop position of said drive pin and rotor under driving influence of said spring means.

4. The remote reader electrical generator assembly of claim 1 wherein said spring means comprises a coil tension spring having one end fastened to said drive pin end out of the path of movement of said drive elements and its opposite end fixed to a stationary portion of the support structure for the generator drive gear train.

5. The fluid meter register and impulse generator of claim 1 wherein said impulse generator assembly includes a frame section comprising upper and lower end plates journalling opposite ends of said rotor shaft and said drive pin is fixed to the rotor pole structure in radial outward relation to the rotor shaft and extends through an arcuate slot in the lower end plate one end of which determines a predetermined stop position of said drive pin and rotor.

6. The fluid meter register and impulse generator of claim 5 wherein said generator drive gear train is supported by a frame section comprising a base wall having an upstanding, radially offset, arcuate wall on one face of said base the upper edge of which abuttingly engages a peripheral marginal portion of an end plate of said impulse generator assembly and the peripheral outer face of which adjacent its oppositely related vertical edges is annularly slotted and respective spring clip strips having opposing inturned edges adapted to respectively enter said annular slots and overlie the opposite end plate of said impulse generator assembly to removably clamp said impulse generator assembly in operative position against said arcuate wall upper edge.

7. The fluid meter register and impulse generator of claim 6 wherein the underside of said frame section is provided with a pair of angularly spaced ears having through passages and coaxially arranged, depending, annular bosses, said register drive gear train is supported by a frame section provided with respective stepped through bores positioned to be aligned with and receive said depending annular bosses, and a casing and bracket assembly is provided to receive and mount said interfitted frame sections and comprises a cross arm bracket having tapped openings in its opposite arms positioned to align with said through passages and stepped through bores and respective securing screws entered through said through passages and stepped through bores and threaded into said tapped openings are provided to secure said interfitted frame sections together and fixedly mount said register drive gear train, said generator drive gear train, and said impulse generator assembly to said cross-arm bracket, thereby providing a unit assembly for attachment to a fluid meter.

8. The fluid meter register and impulse generator of claim 1 wherein said register gear train ratios are chosen to assure a rotation of said output gear assembly at a rate to drive a units counter of a digital counter provided in said fluid meter register one tenth of a revolution for each measured unit flow through said fluid meter, said generator drive input gear fixedly mounts a transparent disk dimensioned to rotate its marginal edge in superjacent relation to the counter wheels of said digital counter, said disk having radially directed, marginally disposed division markings arranged in groups of ten numbered 0 through 9 and the gear ratio between said generator drive input gear and said output gear assembly is chosen to assure one complete revolution of said disk during one tenth of a revolution of said units counter whereby the digital counter units counter and said division markings of said transparent disk together provide meter readings to one one-hundredth of a unit flowing through said fluid meter.

9. The fluid meter register and impulse generator of claim 8 wherein said digital counter and transparent disk are mounted in a frame section provided with a through horizontally disposed window opening to expose said counter and a portion of the marginal edge of said transparent disk for sight reading from a position above the register and impulse generator said frame section supports a second frame section mounting said generator assembly in tiered relation to said meter register, a casing and bracket assembly having an annular, axially upwardly facing shoulder inset axially from its upper end, and an axially elongated, cylindrical plastic cover chordally delimited at one side and having a cylindrical base dimensioned to sealing rest upon said annular shoulder is provided to house said second frame section, said generator assembly, and said cylindrical base outwardly of said chordally delimiting portion of said cover is formed to provide a laterally directed, transparent, planar wall section adapted to overlie said window opening whereby reading of said counter and disk through said wall section is assured with said cover in place.

10. The fluid meter register and impulse generator of claim 9 wherein said plastic cover adjacent and rearwardly of one end of said chordally delimiting portion is provided with an axially elongated depressed area of generally rectangular configuration in cross section through drilled at two spaced points along its base wall and fitted with respective electrical contacts including contact pins disposed inside said cover for effecting an electrical connection to the leads of the impulse generator and externally tapped to receive screws for connecting the leads of a remote reader thereto.

11. The fluid meter register and impulse generator of claim 9 wherein said upper end of said casing comprises an axially extending, annular rim of a length to protrude upwardly beyond the cylindrical base of said plastic cover, a seal ring of generally L-shaped configuration is interposed between said bore of said plastic cover and said upwardly facing inset shoulder and annular rim of said casing and the protruding portion of said annular rim and the overlying portion of said seal ring are folded inwardly over the peripheral edge of said cylindrical base of said cover to sealing clamp said cover in the upper end of said casing.

12. A fluid meter register and impulse generator for energizing a remote reader comprising a casing and bracket assembly for mounting the register and impulse generator on a fluid meter measuring chamber having a fluid driven output rotor, said casing and bracket assembly including an input drive pinion drive connected to said fluid driven output rotor; support frame means fixedly mounted to the bracket of said casing and bracket assembly and mounting a. a counter,
b. a first gear train drivingly connected to said input drive pinion and including an output gear assembly drive connected to the units counter of said counter, said first gear train being geared to advance said units counter to indicate volumetric fluid flow through said measuring chamber,
c. a second gear train including an input gear drive connected to said output gear assembly and including an output gear having an upstanding, driving vane generally diametrically disposed on one gear face, said second gear train being geared to advance said output gear driving vane continuously in one direction at a predetermined speed rate compared to the rotation of said units counter to move the opposite radial sections of said driving vane through one half a revolution of said output gear for a predetermined rotation of said units counter of said digital counter,
d. an impulse generator having a rotor shaft carrying a radially offset drive pin extending into the path of movement of said driving vane whereby rotation of said output gear through engagement of said driving vane with said pin advances said pin and rotor unidirectionally at low speed from a predetermined position of rest through less than 180° rotation to a predetermined release position, and
e. a spring post mounted along an extension of the radius defined by a plane containing the axis of said rotor shaft and spring means interconnecting said drive pin and said spring post normally biasing said drive pin to its position of rest and effective, upon said drive pin reaching its release position, to snap said drive pin and rotor shaft to said position of rest to generate an impulse current for energizing a remote reader registering multiple increments of rotation of said units counter.

13. In a fluid meter register having a register drive gear train including an output gear assembly: a remote reader electrical generator assembly comprising an impulse generator assembly including a stator and a rotor having a drive pin radially offset from the rotor axis with an end protruding from one end of the impulse generator assembly in substantial axial parallelism to the rotor axis; a generator drive gear train having an input gear meshing with said output gear assembly and an output gear rotating on an axis substantially parallel to said rotor axis and disposed in a plane delimited by the rotor axis and the drive pin axis, said output gear including radially directed, upstanding drive elements moving in a path to intercept the protruding end of said drive pin during a predetermined increment of rotational movement of said output gear in one direction to engage said pin end and rotate said rotor at low speed in one direction; and spring means operatively connected to said drive pin and adapted upon said rotor rotation in said one direction to store energy and effective upon termination of said increment of rotational movement of said output gear to release its stored energy to said drive pin and impart high speed rotation of said rotor in the opposite direction thereby generating an output impulse charge of electricity for use in actuating a remote electrical reader.

* * * * *

UNITED STATES PATENT OFFICE
CERTIFICATE OF CORRECTION

Patent No. 3,685,353           Dated Aug. 22, 1972

Inventor(s) David J. Gestler, Zoltan Kovats & Alfred W. Kolakowski

It is certified that error appears in the above-identified patent and that said Letters Patent are hereby corrected as shown below:

Column 4, line 36, change "is" to -- in --.

Column 13, claim 12, line 8, change "to" to -- on --.

Signed and sealed this 27th day of February 1973.

(SEAL)
Attest:

EDWARD M. FLETCHER, JR.           ROBERT GOTTSCHALK
Attesting Officer           Commissioner of Patents